US00RE37932E

(19) United States
(12) Reissued Patent
Baldwin et al.

(10) Patent Number: US RE37,932 E
(45) Date of Reissued Patent: Dec. 10, 2002

(54) SUPERMICROCELLULAR FOAMED MATERIALS

(75) Inventors: Daniel F. Baldwin, Woodstock, GA (US); Nam P. Suh, Sudbury, MA (US); Chul B. Park, Toronto (CA); Sung W. Cha, Seoul (KR)

(73) Assignee: Massachusetts Institute of Technology, Cambridge, MA (US)

(21) Appl. No.: 08/692,060

(22) Filed: Aug. 2, 1996

Related U.S. Patent Documents

Reissue of:
(64) Patent No.: 5,334,356
Issued: Aug. 2, 1994
Appl. No.: 07/934,570
Filed: Aug. 24, 1992

U.S. Applications:
(62) Division of application No. 07/682,116, filed on Apr. 5, 1991, now Pat. No. 5,158,986.

(51) Int. Cl.[7] ..... B32B 27/04
(52) U.S. Cl. ..... 422/133; 264/455; 264/50; 264/53; 264/DIG. 5; 264/DIG. 13; 422/131; 422/134; 422/135; 422/136; 422/137; 422/138; 426/446; 425/4 C; 521/130
(58) Field of Search ..... 422/131, 133, 422/134, 135, 136, 137, 138; 264/45.5, 50, 53, DIG. 5, DIG. 13; 426/446; 425/4 C; 521/130

(56) References Cited

U.S. PATENT DOCUMENTS

| | | | |
|---|---|---|---|
| 3,184,419 | A | 5/1965 | Merriman |
| 3,227,664 | A | 1/1966 | Blades et al. |
| 3,227,784 | A | 1/1966 | Blades et al. |
| 3,277,221 | A | 10/1966 | Parrish |
| 3,375,211 | A | 3/1968 | Parrish |

(List continued on next page.)

FOREIGN PATENT DOCUMENTS

| | | |
|---|---|---|
| EP | 0376064 A2 | 4/1990 |
| EP | 0707935 A2 | 4/1996 |
| JP | 1-209120 | 8/1989 |
| WO | WO89/00918 | 2/1989 |
| WO | WO 90/07546 | 7/1990 |
| WO | WO 92/17533 | 10/1992 |
| WO | WO 95/24440 | 9/1995 |

OTHER PUBLICATIONS

Kolossow, K.D., "Extrusion of Foamed Intermediate Products With Singe–Screw Extruders", *Plastic Extrusion Technology,* pp. 441–449, 1988.

Lacallade, R., Addiitives for Plastics–Chemical Blowing Agents for SF *"Plastics Engineering",* vol. 32, pp. 40–42, Jun. 1976.

Park, C.B. et al., "Cell Nucleation by Rapid Pressure Drop in Continuous Processing of Microcellular Plastics", *Use of Plastics and Plastic Composites: Materials and Mechanics Issues,* MD–vol. 46, pp. 537–552, ASMF 1993.

(List continued on next page.)

*Primary Examiner*—Krisanne Thornton
(74) *Attorney, Agent, or Firm*—Dike, Bronstein, Roberts and Cushman, Intellectual Property Practice Group of Edwards & Angell, LLP

(57) ABSTRACT

A supermicrocellular foamed material and a method for producing such material, the material to be foamed such as a polymerplastic material, having a supercritical fluid, such as carbon dioxide in its supercritical state, introduced into the material to form a foamed fluid/material system having a plurality of cells distributed substantially throughout the material. Cell densities lying in a range from about $10^9$ to about $10^{15}$ per cubic centimeter of the material can be achieved with the average cell sizes being at least less than 2.0 microns and preferably in a range from about 0.1 micron to about 1.0 micron.

37 Claims, 10 Drawing Sheets

U.S. PATENT DOCUMENTS

| | | | |
|---|---|---|---|
| 3,375,212 | A | 3/1968 | Bonner |
| 3,384,531 | A | 5/1968 | Parrish |
| 3,584,090 | A | 6/1971 | Parrish |
| 3,637,458 | A | 1/1972 | Parrish |
| 3,730,916 | A | 5/1973 | Etchells |
| 3,787,543 | A | 1/1974 | Parrish |
| 3,796,779 | A | 3/1974 | Greenberg |
| 3,812,225 | A | 5/1974 | Hosoda et al. |
| 3,882,209 | A | 5/1975 | Yanagisawa et al. |
| 4,155,969 | A | 5/1979 | Hendry |
| 4,211,523 | A | 7/1980 | Hunerberg |
| 4,255,371 | A | 3/1981 | Shimovashiki et al. |
| 4,390,332 | A | 6/1983 | Hendry |
| 4,424,287 | A | 1/1984 | Johnson et al. |
| 4,454,087 | A | 6/1984 | Havachi |
| 4,455,272 | A | 6/1984 | Schubert et al. |
| 4,456,571 | A | 6/1984 | Johnson |
| 4,473,665 | A | 9/1984 | Martini-Vvedensky et al. |
| 4,548,775 | A | 10/1985 | Hayashi et al. |
| 4,719,246 | A | 1/1988 | Murdoch et al. |
| 4,728,559 | A | 3/1988 | Hardenbrook et al. |
| 4,746,477 | A | 5/1988 | Wecker et al. |
| 4,761,256 | A | 8/1988 | Hardenbrook et al. |
| 4,783,295 | A | 11/1988 | Kearns et al. |
| 4,791,144 | A | 12/1988 | Nagou et al. |
| 4,832,881 | A | 5/1989 | Arnold, Jr. et al. |
| 4,873,218 | A | 10/1989 | Pekala et al. |
| 4,906,672 | A | 3/1990 | Stone et al. |
| 4,990,542 | A | 2/1991 | Motani et al. |
| 5,034,171 | A | 7/1991 | Kiczek et al. |
| 5,064,587 | A | 11/1991 | Meyke et al. |
| 5,064,874 | A | 11/1991 | Motani et al. |
| 5,082,608 | A | 1/1992 | Karabedian et al. |
| 5,110,998 | A | 5/1992 | Muschiatti |
| 5,120,559 | A | 6/1992 | Fizvi et al. |
| 5,133,913 | A | 7/1992 | Miyakawa et al. |
| 5,158,986 | A | 10/1992 | Cha |
| 5,160,674 | A | 11/1992 | Colton et al. |
| 5,250,577 | A | 10/1993 | Welsh |
| 5,266,605 | A | 11/1993 | Welsh |
| 5,866,053 | A | 2/1999 | Park et al. |

OTHER PUBLICATIONS

Baldwin, D.F., et al., "A Processing System for the Extrusion of Microcellular Polymer Sheets Sheets: . . . ", Cellular and Microcellular Materials, MD–vol. 53:85–107 (ASME 1994).

LeMay, J.D. et al., "Low Density Microcellular Material", *MRS Bulletin,* Dec. 1990, pp. 19–45.

Cha, S.W., "A Microcellular Foaming/Forming Process Performed at Ambient Temperataure and a Temperature and a Super–Microcellular Foaming Process", (M.I.T. 1994).

Baldwin, D.F., "Microcellular Polymer Processing and the Design of a Continuous Sheet Processing System", Chapter 8, pp. 204, 205, 241, (M.I.T. 1994).

Park, C.B., "The Role of Polymer/Gas Solutions in Continuous Processing of Microcellular Microcellular Polymers", Chapter VII, pp. 128–130.

| SUPERCRITICAL FLUID | C.T. (°C) | C.P. (psi) |
|---|---|---|
| $CO_2$ | 31.1 | 1071.3 |
| ETHANE | 32.3 | 708.3 |
| ETHYLENE | 9.3 | 742.1 |
| $N_2$ | -147.0 | 492.3 |
| Fr - 12 | 115.7 | 581.9 |
| $O_2$ | -118.6 | 736.2 |
| AMMONIA | 132.5 | 1635.7 |
| WATER | 374.2 | 3208.1 |

(x 2000)

(x 1000)

(x 5000)

(x 5000)

(x 2000)

(x 2000)

SUPERMICROCELLULAR FOAMED MATERIALS

Matter enclosed in heavy brackets [ ] appears in the original patent but forms no part of this reissue specification; matter printed in italics indicates the additions made by reissue.

This is a divisional of copending application Ser. No. 07/682,116 filed on Apr. 5, 1991, now U.S. Pat. No. 5,158,986.

INTRODUCTION

This invention relates generally to foamed materials, preferably foamed plastic materials, and to techniques for making and using such materials, and, more particularly, to the use of supercritical fluids for producing supermicrocellular foamed materials which can achieve a relatively wide range of material densities and a large number of extremely small voids or cells per unit volume therein.

BACKGROUND OF THE INVENTION

Techniques for making conventional foamed materials, such as foamed polymer plastic materials, have been well known for many years. Standard techniques for such purpose normally use chemical or physical blowing agents. The use of chemical agents is described, for example, by Lacallade in the test, "Plastics Engineering," Vol. 32, June 1976 which discusses various chemical blowing agents, which agents are generally low molecular weight organic compound which decompose at a critical temperature and release a gas (or gases) such as nitrogen, carbon dioxide, or carbon monoxide. Techniques using physical agents include the introduction of a gas as a component of a polymer charge or the introduction of gases under pressure into molten polymer. Injection of a gas into a flowing stream of molten plastic is described, for example, in U.S. Pat. No. 3,796,779 issued to Greenberg on Mar. 12, 1976. Such earlier used and standard foaming processes produce voids or cells within the plastic materials which are relatively large, e.g., on the order of 100 microns, or greater, as well as relatively wide ranges of void fraction percentages e.g., from 20%–90% of the parent material. The number of voids per unit volume is relatively low and often there is a generally non-uniform distribution of such cells throughout the foamed material. Such materials tend to have relatively low mechanical strengths and toughness and there is an ability to control the dielectric constant thereof.

In order to improve the mechanical properties of such standard cellular foamed materials, a microcellular process was developed for manufacturing foamed plastics having greater cell densities and smaller cell sizes. Such a process is described, for example, in U.S. Pat. No. 4,473,665 issued on Sep. 25, 1985 to J. E. Martini-Vredensky et al. The improved technique provides for presaturating the plastic material to be processed with a uniform concentration of a gas under pressure and the provision of a sudden induction of thermodynamic instability in order to nucleate a large number of cells. For example, the material is presaturated with the gas and maintained under pressure at its glass transition temperature. The material is suddenly exposed to a low pressure to nucleate cells and promote cell growth to a desired size, depending on the desired final density, thereby producing a foamed material having microcellular voids, or cells, therein. The material is then quickly further cooled, or quenched, to maintain the microcellular structure.

Such a technique tends to increase the cell density, i.e., the number of cells per unit volume of the parent material, and to produce much smaller cell sizes than those in standard cellular structures. The microcellular process described tends to provide cell sizes that are generally smaller than the critical sizes of flaws that preexist in polymers so that the densities and the mechanical properties of the materials involved can be controlled without sacrificing the mechanical properties of some polymers, such as the mechanical strength and toughness of the polymer. The resulting microcellular foamed materials that are produced, using various thermoplastics and thermosetting plastics, tend to have average cell sizes in the range of 3 to 10 microns, with void fractions of up to 50% of the total volume and maximum cell densities of about one billion ($10^9$) voids per cubic centimeter of the parent material.

Further work in producing microcellular foamed plastic material is described in U.S. Pat. No. 4,761,256 issued on Aug. 2, 1988 to Hardenbrook et al. As set forth therein, a web of plastic material is impregnated with an intert gas and the gas is diffused out of the web in a controlled manner. The web is reheated at a foaming station to induce foaming, the temperature and duration of the foaming process being controlled prior to the generation of the web to produce the desired characteristics. The process is designed to provide for production of foamed plastic web materials in a continuous manner. The cell sizes in the foamed material appear to lie within a range from 2 to 9 microns in diameter.

It is desirable to obtain improved foamed materials which will provide even smaller cell sizes, e.g., 1.0 micron or less, and much higher cell densities as high as several thousand trillions of voids per cubic centimeter, i.e., on the order of $10^{15}$, or so, voids per cubic centimeter of the parent material, for example. Such materials should also have a capability of providing a wide range of void fraction percentages from very high void fractions (low material densities) up to 90%, or more, to very low void fractions (high material densities) down to 20%, or less.

Further, it is desirable to be able to produce microcellular plastics at or near ambient temperature, so as to eliminate the need to heat the plastic during the process thereby simplifying the manufacturing process. Moreover, it is further desirable to increase the speed at which a fluid is dissolved in a polymer so that the overall time of the foaming process can be significantly reduced so as to increase the rate of production of the foamed material.

No processes used or proposed for use to date have been able to provide foamed materials having such extremely small cell sizes, such extremely high cell densities and such a wide range of material densities that provide improved material characteristics. Nor have techniques been proposed to obtain such materials at ambient temperature and at increased production rates.

BRIEF SUMMARY OF THE INVENTION

In accordance with the invention, supermicrocellular foamed materials are formed by using supercritical fluids, i.e., gases in their supercritical state, which supercritical fluids are supplied to the materials to be foamed. The supercritical fluid is used as the foaming agent in a parent material, preferably, for example, in a polyester plastic material. A relatively high density supercritical fluid made at a relatively low temperature and a relatively high pressure is used to saturate the polymer without the need to raise the saturation temperature of the process to the melting point of the polymer.

While the mechanism for achieving saturation is not fully understood in detail, it is believed that the supercritical fluid (as a solute) is initially dissolved in the polymer material (as a solvent) until the concentration percentage of supercritical fluid in the polymer reaches a reasonable level, e.g., perhaps about 10% to 40%. At some percentage level then, it is believed that supercritical fluid then tends to act as a solvent and the polymer tends to act as a solute. However, whether the supercritical fluid and polymer act as solvents or solutes during the process, at some time following the introduction of supercritical fluid into the polymer, an effectively saturated solution of the fluid and the polymer is produced. Although the aforesaid description is believed to be a reasonable theoretical explanation of what occurs during the process involved, the invention is not be construed as requiring that such specific process necessarily occurs in the manner so described.

When the fluid/polymer solution contains a sufficient amount of supercritical fluid therein at a suitably selected temperature and pressure, the temperature and/or pressure of the fluid/polymer system is rapidly changed to induce a thermodynamic instability and a foamed polymer is produced. The resulting foamed material can achieve a cell density of several hundred trillions of voids per cubic centimeter and average void or cell sizes of less than 1.0 micron, in some cases less than 0.1 micron. Moreover, in accordance with the invention, the foaming of such materials can in some cases be achieved at ambient (room) temperature conditions.

BRIEF DESCRIPTION OF THE DRAWINGS

The invention can be described in more detail with the help of the following drawings wherein.

A supercritical fluid can be defined as a material which is maintained at a temperature which exceeds a critical temperature and at a pressure which exceeds a critical pressure so as to place the material in a supercritical fluid state. In such state, the supercritical fluid has properties which cause it to act, in effect, as both a gas and a liquid. Thus, in the supercritical state, such a fluid has the solvent characteristics of a liquid, but the surface tension thereof is substantially less than that of a liquid so that the fluid can diffuse much more readily into a solute material, as in the nature of a gas.

Figure 1:
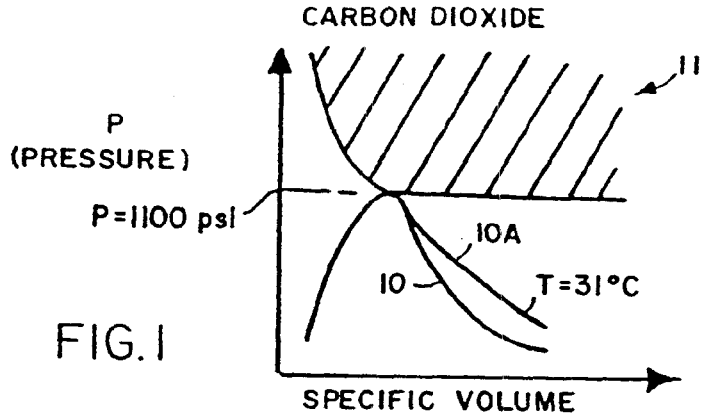
FIGS. 1 and 1A depict graphs of the pressure vs. specific volume relationship showing the region in which a supercritical state is achieved for carbon dioxide.
Figure 1A:
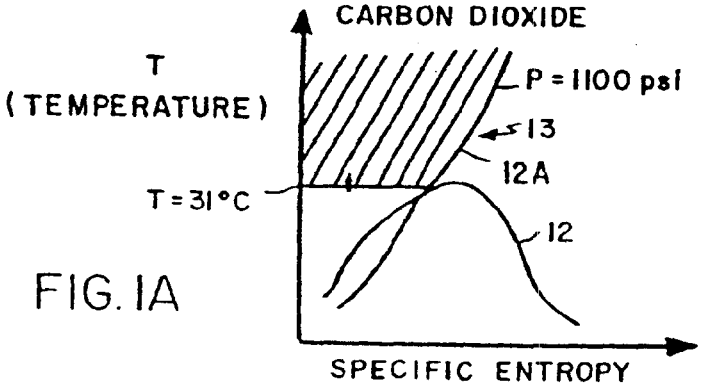
Figure 1B:
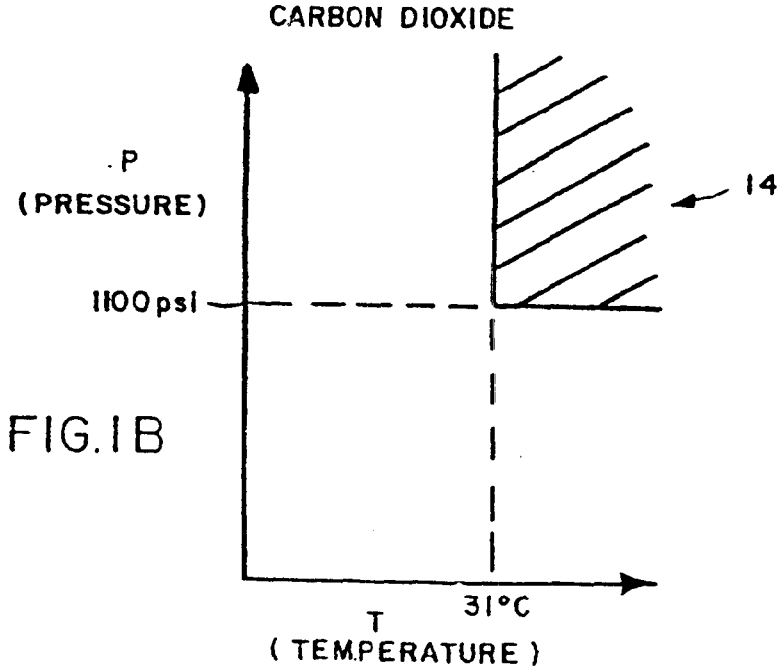
FIG. 1B depicts a graph of the pressure vs. temperature relationship showing the region in which a supercritical state is achieved for carbon dioxide.

For example, it is known that carbon dioxide ($CO_2$) can be placed in a supercritical state when its temperature exceeds 31° C. and it pressure exceeds 1100 psi. FIGS. 1 and 1A, for example, depict curves 10 and 12 of pressure vs. specific volume (FIG. 1) and temperature vs. specific entropy (FIG. 1A) for carbon dioxide. When the pressure is above 1100 psi and the temperature is above 31° C. (curve 10A) exemplified by the shaded region 11 of FIG. 1, and when the temperature is above about 31° C. and the pressure is above 1100 psi (curve 12A) exemplified by the shaded region 13 of FIG. 1A, carbon dioxide is provided in its supercritical state. As depicted another way, FIG. 1B shows the pressure vs. temperature relationship for $CO_2$ in which such critical pressure (1100 psi) and critical temperature (31° C.) are depicted so as to define the supercritical state by the shaded region 14.

Figures 2, 3:
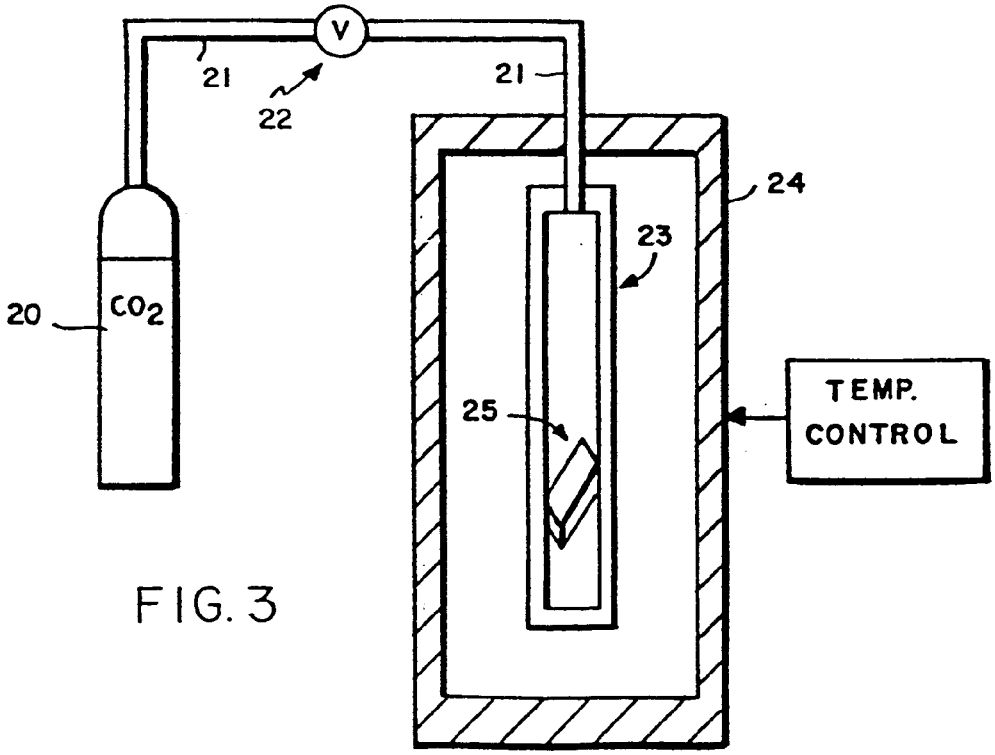
FIG. 2 depicts a chart of critical temperatures and critical pressures required for placing various materials in their supercritical fluid states.
FIG. 3 depicts a diagrammatic view of an exemplary system for forming supermicrocellular foamed materials in accordance with the invention.

The chart of FIG. 2 depicts the critical temperatures and pressures for various known exemplary materials, above which values such materials are placed in their supercritical fluid states.

FIG. 3 shows a diagrammatic view of an exemplary system for use in forming supercritical foamed materials in accordance with the invention. As can be seen therein, a source of carbon dioxide in a non-critical state is provided from a pressurized $CO_2$ cylinder 20 in which $CO_2$ is maintained at a pressure and temperature below the above discussed critical values. The $CO_2$ therein is supplied through conduit 21 via a high pressure valve 22 to a high pressure chamber 23. The temperature of the chamber can be controlled, for example, by placing the chamber in a temperature controlled enclosure 24. A material 25, such as a polymer plastic material, is placed within chamber 23. The temperature of the chamber is controlled to be set at a selected initial temperature level.

Figure 4:
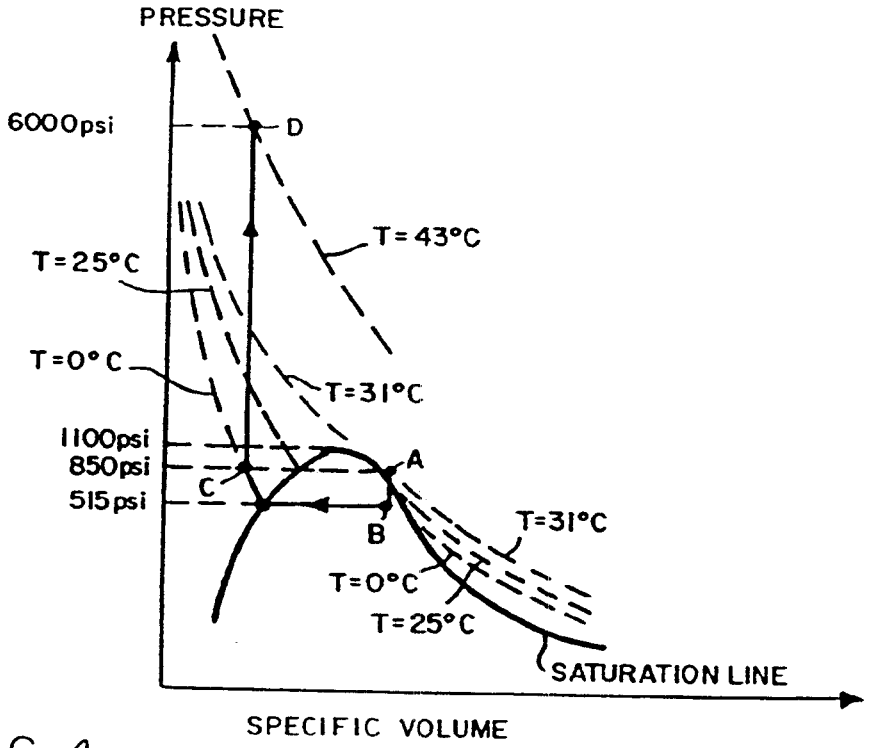
FIGS. 4 and 5 depict graphs of pressure vs. volume relationships helpful in understanding an exemplary method of the invention for an ideal and for an actual operation of the system of FIG. 3 when using carbon dioxide.
Figure 5:
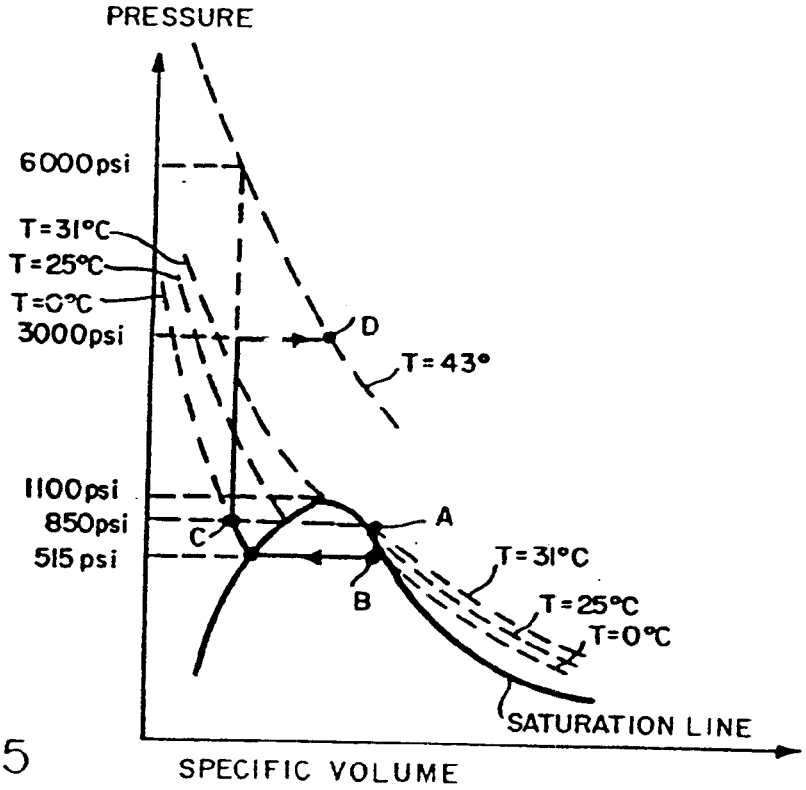

In order to understand the process of the invention for providing a supercritical fluid, such as $CO_2$ in its supercritical state, to chamber 23 for use in producing a foamed material, it is helpful to consider the pressure-volume relationships shown in FIGS. 4 and 5 which depict such relationships both ideally (FIG. 4) and in an actual experiment case (FIGS. 5) when $CO_2$ is used in its supercritical fluid state with a soft polyvinyl chloride polymer plastic.

In accordance with a specific exemplary process for providing a supercritical $CO_2$ fluid, the temperature of chamber 23 is initially set at 25° C., via a suitable temperature control of enclosure 24 using control technique as would be well-known to those in the art. A $CO_2$ gas is maintained in cylinder 20 at a pressure of 850 psi (5.8 MPa), for example, and high pressure valve 22 is opened to supply $CO_2$ gas at such pressure to chamber 23 via conduit 21. Valve 22 is closed (point A of FIGS. 4 and 5) so that initial conditions of a temperature of 25° C. and a pressure of 850 psi are established in chamber 24.

The temperature of chamber 24 is then reduced to 0° C. at which point the pressure drops to 515 psi (point B of FIGS. 4 and 5). The specific volume is reduced and the high pressure valve 22 is then opened (point B of FIGS. 4 and 5), so that the pressure in chamber 23 again rises to the 850 psi level of the $CO_2$ cylinder (point C of FIGS. 4 and 5). The temperature of the chamber is then again controlled so as to increase from 0° C. to a much higher temperature, selected in this exemplary case as 43° C. The pressure rises from 850 psi to a much higher value shown theoretically in the ideal case as 6000 psi (point D of FIG. 4). In a practical case, the pressure must be controlled so as not to exceed the limits imposed by the chamber 23. In a practical case, the high pressure value, for example, is increased to 3000 psi (point D of FIG. 5).

At point D, the $CO_2$ is in a super critical state and acts as a supercritical fluid. At such point, the $CO_2$ is supplied to the polymer plastic material 25 to form a fluid/polymer solution containing a sufficient amount of supercritical $CO_2$ for a supermicrocellular foaming process. In effect the solution can be thought of as being saturated with supercritical $CO_2$, which saturation process occurs over a particular saturation time period, depending on the thickness of the polymer plastic. For example, if material 25 is a sheet of plasticized polyvinylchlorine (PVC) material, having a thickness of about 1/16 inch, a sufficient time period for such operation is about 5 minutes, such time being more or less dependent on the diffusion distance of the polymer (the thickness thereof) and the diffusion characteristics of the super-critical fluid, e.g., $CO_2$, in the particular polymer used.

Figure 6:
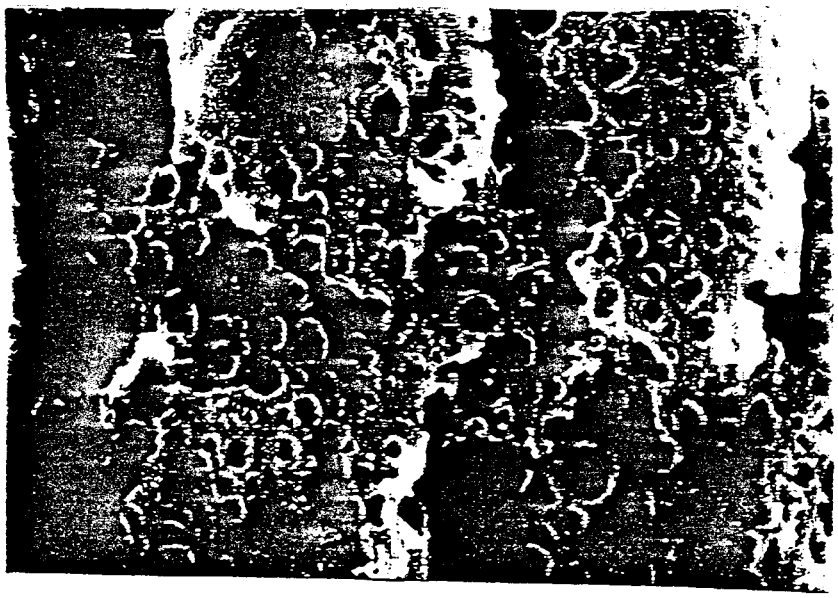
FIGS. 6, 7, 8, 9, 10, and 11 depict microphotographs showing typical cross-section views of the cells produced in various supermicrocellular foamed materials in accordance with the invention (note that micron scales indicated in the figures)

Following formation of the desired fluid/polymer material, the chamber is opened and the material is removed therefrom so that the pressure and temperature thereof rapidly assumes ambient room conditions (e.g., 77° F., 0.1 Mpa). Such rapid changes in temperature/pressure conditions induced a thermodynamic instability so that forming (cellular nucleation and cell expansion) takes place within the material. The foaming time to achieve a desired supermicrocellular foam PVC material, for example, is about one or two minutes, such time being more or less dependent on the temperature of the material prior to removal. It is found that such PVC material achieves a cell density of about $2\times10^{12}$ cells/cc. and an average cell size of about 0.8 microns. The cell density is primarily a function of the amount of supercritical fluid in the fluid/polymer solution as measured relative to the unfoamed material. A microphotograph of an exemplary cross-section of such material is shown in FIG. 6. magnified 2000 times, the cell distribution being substantially uniform throughout the material.

Figure 7:
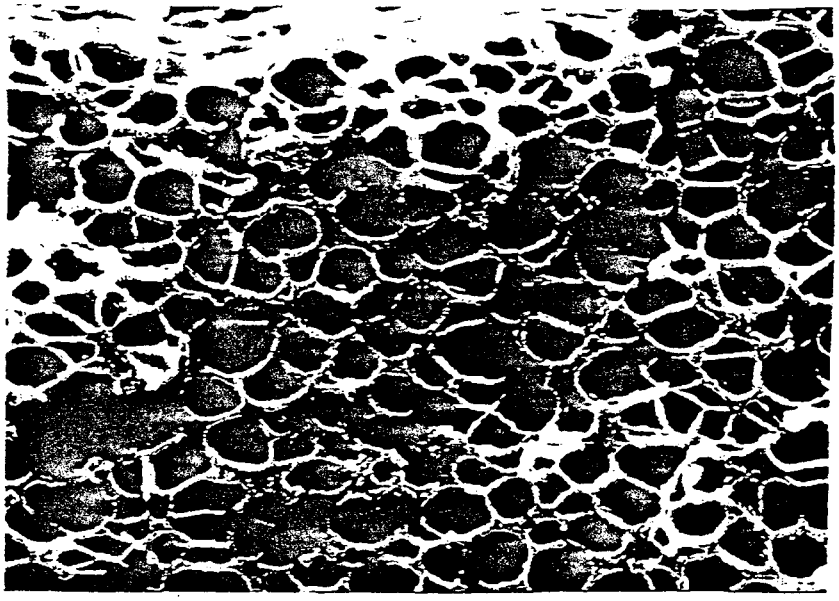

Similar experimental foamed materials were made using substantially the same technique. For example, a glycol modified polyethylene-terephthalate (i.e., co-polyester) polymer material (PETG) was supplied with sufficient supercritical $CO_2$ fluid over a time period of about 10 hours and, when removed to room temperature and pressure conditions, the fluid/polymer system was found to foam in about one or two minutes, thereby producing a supermicrocellular foamed PETG material having a substantially uniform cell distribution, a cell density of about $3\times10^{10}$ cells/cc. and an average cell size of about 5 microns. A microphotograph thereof is shown in FIG. 7 at a magnification of 1000 times.

Figure 8:
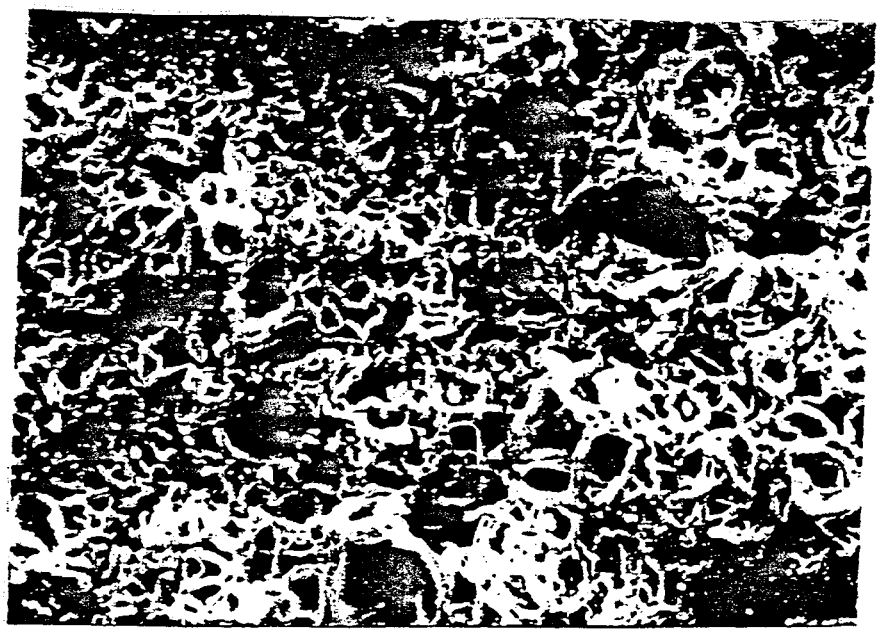

In some cases, particularly when using a semi-crystalline material, it has been found that the foaming temperature must be higher than ambient room temperature. For example, when a sheet of rigid PVC material having a thickness of 1/16 inch 1.59 mm) is used, an effectively saturated fluid/polymer system can occur at a pressure of about 1500 psi (10.2 MPa) and a temperature of 43° C. over a time period of about 15 hours. Following the formation thereof, the material is foamed at a much higher temperature than ambient room temperature, e.g., at 160° C. at ambient pressure. Such foaming can be produced by removing the saturated rigid PVC polymer from the chamber 24 and placing it in a liquid glycerin bath the temperature of which is at the desired 160° C. level Supermicrocellular foaming was found to take place in about 10 seconds. In such case, an average cell size of about 1.0 micron and a cell density of about $2\times10^{12}$ cells/cc. was achieved, there being a reasonably uniform distribution of such cells throughout the material. A microphotograph of such foamed rigid PVC material is shown in FIG. 8 at a magnification of 5000 X.

Figure 9:
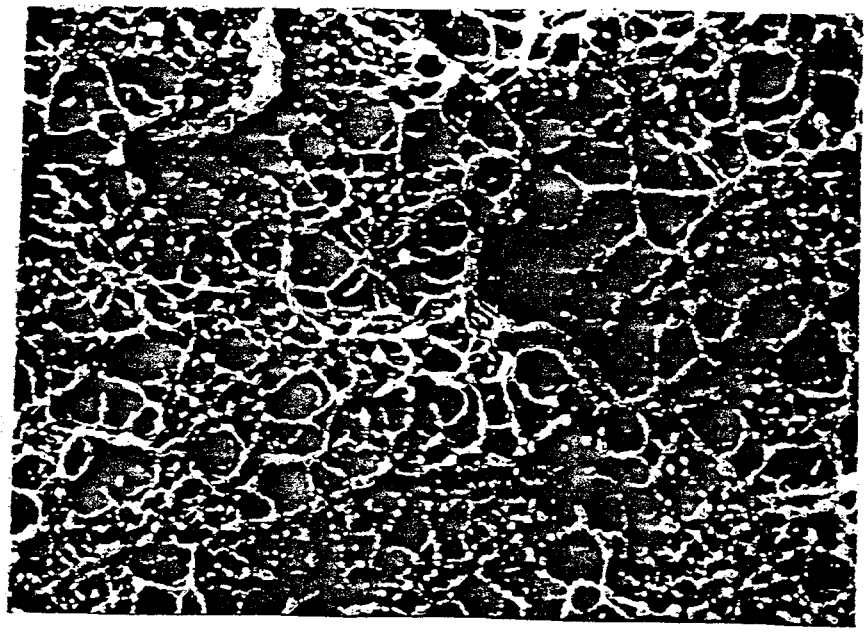
Figure 10:
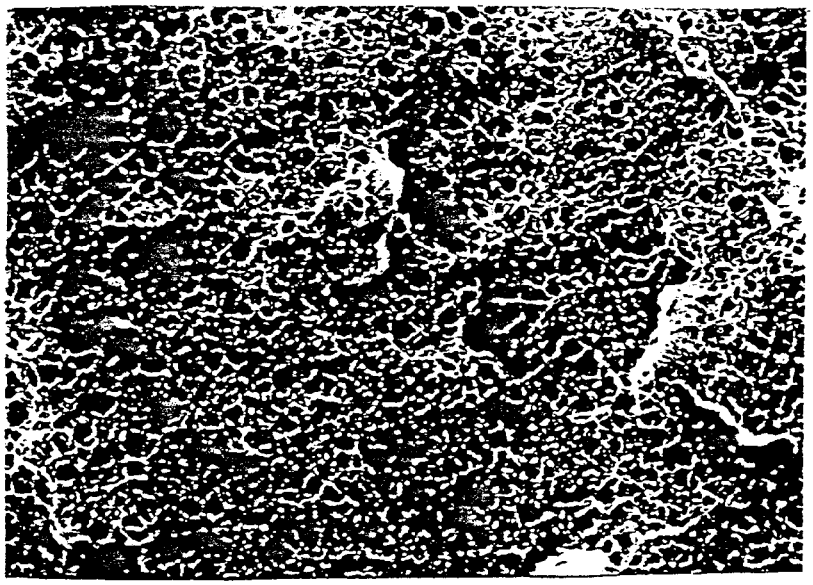

As similar foaming temperature 160° C. was used for both low density and high density polyethylene (LDPE and HDPE) polymers. In the case of a low density sheet of PE having a thickness of 1/16 inch (1.59 mm), the formation of a suitable fluid/polymer system took place at a pressure of 3000 psi and a temperature of 43° C. over a 10 hour time period, while supermicrocellular foaming occurred at the 160° C. level at ambient pressure in about 20 seconds. Such operation produced very small average cell sizes of about 0.1 micron and cell densities of about $5\times10^{14}$ cells/cc. In the case of a sheet of high density PE having a thickness of 1/16/ inch (1.59 mm), formation of a desired fluid/polymer system also occurred at 3000 psi and 43° C. over a 10 hour time period, while foaming occurred at 160° C. and ambient pressure in about 20 seconds. Such operation produced very small average cell sizes of about 0.2 microns and cell densities of about $6\times10^{13}$ cells/cc. Microphotographs of exemplary foamed LDPE polymers and foamed HDPE polymers are shown in FIGS. 9 and 10, respectively, at magnifications of 5000 X (FIG. 9) and of 2000 X (FIG. 10), respectively.

Figure 11:
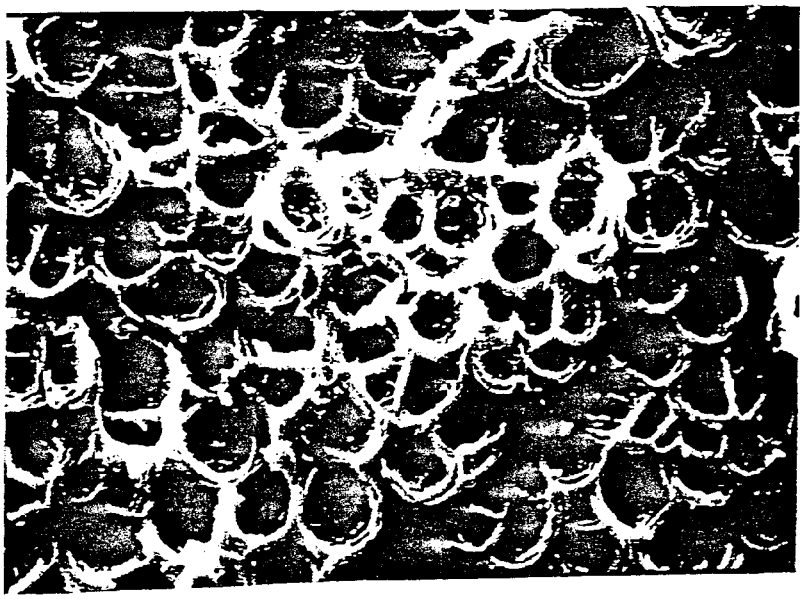

In a further exemplary case, a sheet of polycarbonate polymer having a thickness of 1/16 inch was supplied with supercritical $CO_2$ to form a suitable fluid/polymer system at a pressure of 1500 psi (10.2 MPa) and 43° C. over a 15 hours time period, while foaming occurred at 160° C. and ambient pressure in about 10 seconds to produce average cell sizes of about 2 microns and cell densities of about $2\times10^{11}$ cells/cc. A microphotograph of an exemplary cross-section thereof is shown in FIG. 11 at a magnification of 2000 X.

Figure 12:
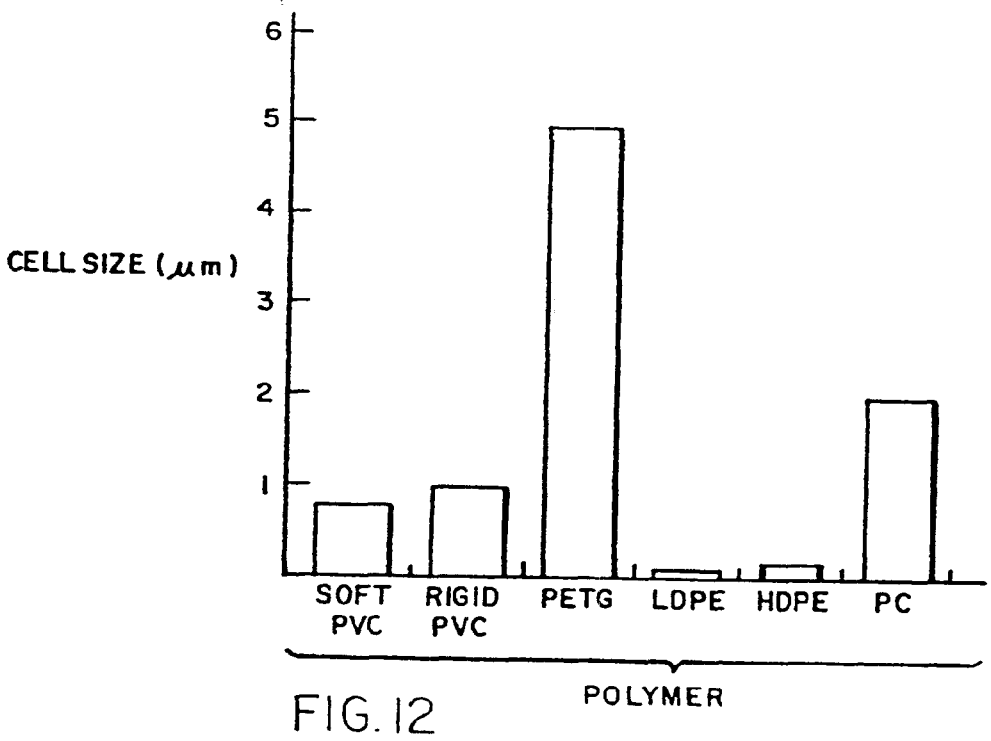
FIG. 12 depicts bar graphs of the average cell sizes produced for various supermicrocellular foamed polymer plastic materials formed in accordance with the invention under substantially the same exemplary conditions.
Figure 13:
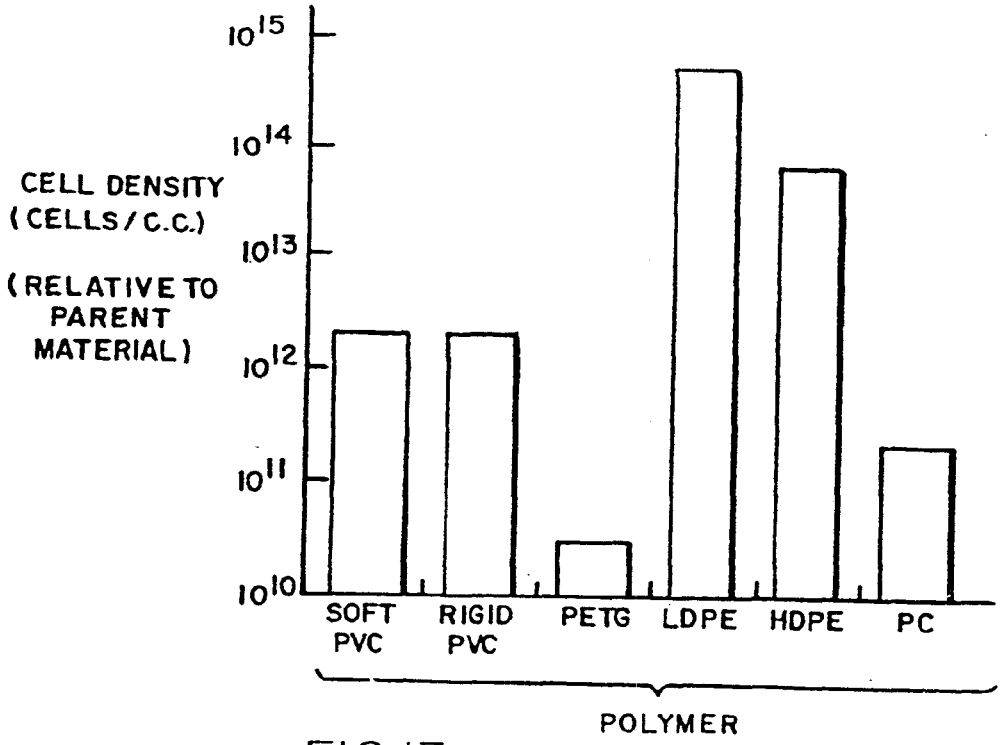
FIG. 13 depicts bar graphs of the average cell densities produced for the various supermicrocellular foamed polymer plastic materials shown in FIG. 12 formed under substantially the same exemplary conditions.

The bar diagrams depicted in FIGS. 12 and 13 show the correlation between average cell sizes and cell densities for the above discussed exemplary foamed materials. In the figures, the bars as related to each material are so designated in each case and, as can be seen, generally the smaller the cell sizes obtained the greater the cell densities that can be achieved.

While the producing of a supercritical fluid for use in the process of the invention is performed in the above particular examples at a temperature of 43° C. and at pressures of 1500 psi or 3000 psi, such temperatures can range from about 35° C. to about 45° C., or higher, and such pressures can range from about 1400 psi to about 6000 psi, or more. The supercritical fluid should have a relatively high density, e.g., for supercritical $CO_2$ fluid a density of about 0.016 moles per cubic centimeter to about 0.022 moles per cubic centimeter can be used.

Figure 14:
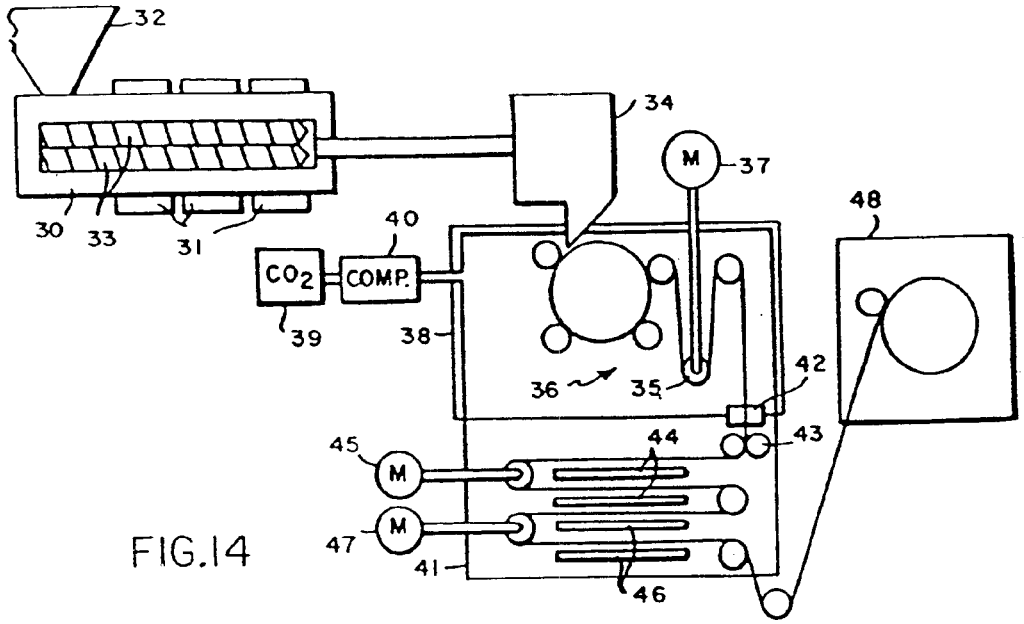
FIG. 14 depicts a continuous system using extrusion techniques for providing sheets of foamed materials in accordance with the invention.

Although the technique described above with reference to FIG. 3 is in effect a batch processing technique, foamed materials can also be made using a continuous process in which polymer plastic pellets or sheets are used. FIG. 14, for example, depicts one such continuous technique using a co-rotating twin screw extruder of a type well-known to those in the art for supplying a sheet of polymer to a chamber 38 for foaming of the polymer using a supercritical fluid.

As seen in the diagram of FIG. 14, an extruder barrel 30 having a plurality of barrel heaters 31 has a polymer material, e.g., in the form of polymer pellets, supplied thereto via a hopper 32. Extruder barrel 30 contains a co-rotating meshing twin screw assembly 33 for extruding polymer plastic material to a sheet die 34. A continuous sheet of polymer material is thereby supplied to an arrangement 36 of rollers held at a substantially constant temperature. A motor 37 is used to control the position of roller 35 so as to control in turn the residence time of the polymer sheet in chamber 38 by controlling the length of the sheet resident in the chamber. The roller system 36 is positioned within a chamber 38 to which is supplied a supercritical fluid from a source 39 thereof. For example, a source 39 of $CO_2$ in a gaseous form supplies $CO_2$ gas to a compressor 40, the temperature of the gas and the pressure at the compressor being controlled to place the $CO_2$ in its supercritical state when it is supplied to chamber 38.

As the sheet of polymer plastic travels through the roller system 36 at a selected speed, e.g., at a linear space of about 1.0 inch/second, the supercritical fluid and the polymer form a fluid/polymer system, sufficient fluid being supplied so that the sheet is effectively saturated with fluid as it leaves chamber 38. The saturated sheet of polymer emerges from chamber 38 into a foaming chamber 41 via a suitable dynamic pressure seal 42 and thence through a pair of chilled rollers 43. The drop in pressure occurring from the pressure in chamber 38 to the pressure in chamber 41, e.g., ambient pressure, as the fluid/polymer sheet exits through the dynamic seal 42 to the chilled rollers 43 causes a nucleation of cells within the fluid/polymer material which cellular nucleation is maintained at the chilled rollers 43. The fluid/polymer sheet material is then heated by passing the sheet adjacent foaming heaters 44, the time of residence therethrough being controlled by changing the length of the sheet resident in chamber 41 adjacent heaters 44 using a motor 45. The increase in temperature of the fluid/polymer material causes the nucleated cells to expand so that the polymer material is appropriately foamed as it leaves the region of the foaming heaters 44.

In a further optional step, the foamed material can then be annealed, e.g., for crystallization of the foamed polymer, if desired, by supplying the foamed sheet material to annealing heaters 46, the time for such annealing process being controlled by changing the length of the sheet resident adjacent heaters 46 using a motor 47. The foamed, and annealed, material can then be supplied from foaming chamber 41 to a take-up roller device 48 for storage.

Figure 15:
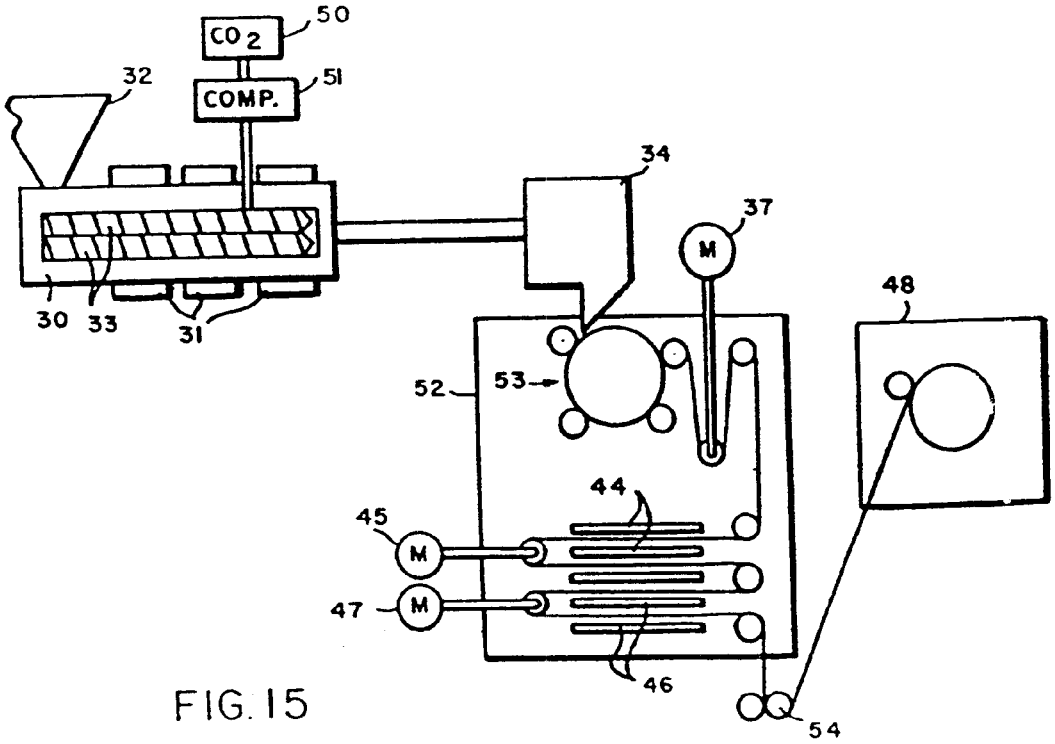
FIG. 15 depicts an alternative continuous system using extrusion techniques in accordance with the invention.

An alternative continuous foaming process is depicted in FIG. 15 using the system of FIG. 14 in a somewhat different manner. As can be seen therein, a supercritical fluid is supplied to a polymer plastic material while the latter material is being extruded from extruder barrel 30, the supercritical fluid, e.g., $CO_2$, being obtained from a $CO_2$ gas supply 50 and a compressor 51, as before. The supercritical fluid is supplied to the interior of heated extruder barrel 30 at an appropriately selected position so as to introduce the fluid into the molten polymer material. Sufficient supercritical $CO_2$ is supplied so as to form a molten fluid/polymer material in which the polymer is effectively saturated with supercritical fluid. The molten fluid/polymer material exists from extruder barrel 30 and is supplied to a sheet die 34. Sheet die 34 forms a sheet of such fluid/polymer material, which saturated sheet is then supplied to an arrangement 53 of chilled rollers in a foaming chamber 52. The pressure in the chamber 52 is maintained at a level lower than that at the extruder barrel exist and as the pressure drops upon entering of the fluid/polymer material into chamber 52, cell nucleation occurs within the material. The chilled rollers maintain the cell nucleation condition and the fluid/polymer material is then supplied to foaming heaters 44, where cell expansion and, thereby, completion of the foaming process is achieved. As in the system of FIG. 14, the foamed polymer material can be annealed, e.g., for crystallization of the foamed polymer if desired, by annealing heaters 46 (optional) and the annealed foamed polymer material can exit the foaming chamber for supply to a take-up device 48 via chilled rollers 54. Motors 37, 45 and 47 are used as above, to control the residence times of the sheet at the corresponding regions of chamber 52.

Figure 16:
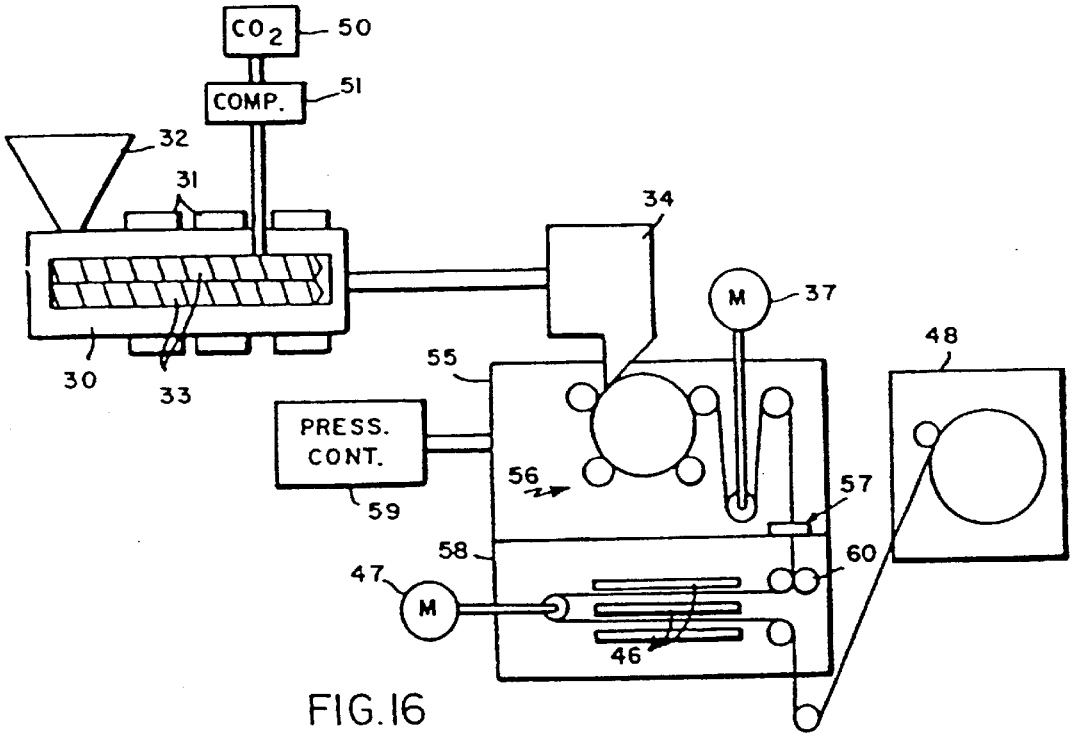
FIG. 16 depicts a further alternative continuous system using extrusion techniques in accordance with the invention.

A further alternative embodiment of the continuous process shown in FIGS. 14 and 15 is depicted in FIG. 16, wherein a supercritical fluid, e.g., $CO_2$ in its supercritical state, is supplied to an extruder barrel 30, as in FIG. 15, for providing saturated extruded fluid/polymer material therefrom. The extruded material is then formed into a sheet of fluid/polymer material and supplied to a pressurized chamber 55, the pressure in which is suitably controlled by a pressure controller 59. The sheet material is supplied to an arrangement 56 of constant temperature rollers and thence exits chamber 55 via a dynamic pressure seal 57.

If the pressure in chamber 55 is maintained at substantially the same pressure as the saturation pressure of the supercritical fluid supplied by compressor 51, both cell nucleation and cell expansion occur as the fluid/polymer sheet exits via dynamic seal 57 due to the pressure drop from the pressure in chamber 55 to the lower pressure in an annealing chamber 58. The foamed polymer material is then passed through chilled rollers 60 to maintain its foamed condition and supplied to annealing heaters 46 and thence to take-up device 48, as before. Residence times in chambers 55 and 58 are controlled by motors 37 and 47, respectively, as before.

If the pressure in chamber 55 is controlled to be at a level below that of the saturation pressure of the supercritical fluid supplied by compressor 51, cell nucleation occurs as the sheet material exits sheet die 34 into the lower pressure chamber 55. The chilled rollers 56 maintain the nucleated cells. Cell expansion then occurs as the polymer material exists at dynamic seal 57 to an even lower pressure annealing chamber 58, e.g., at ambient pressure, so that the completely foamed polymer material is obtained at that point. The chilled rollers 60 maintain the cell expansion. In such an operation as depicted in FIG. 16, foaming (i.e., cell nucleation and cell expansion) takes place substantially solely due to the pressure differentials which occur in the system. Such operation can be contrasted with that of FIG. 14, for example, wherein cell nucleation occurs due to the pressure differential at dynamic seal 42 and cell expansion occurs due to the temperature differential at foaming heaters 44. Such operation can also be contrasted with that of FIG. 15, for example, wherein cell nucleation occurs due to the pressure differential at the exit of sheet die 34 and cell expansion occurs due to the temperature differential at forming heaters 44.

Figure 17:
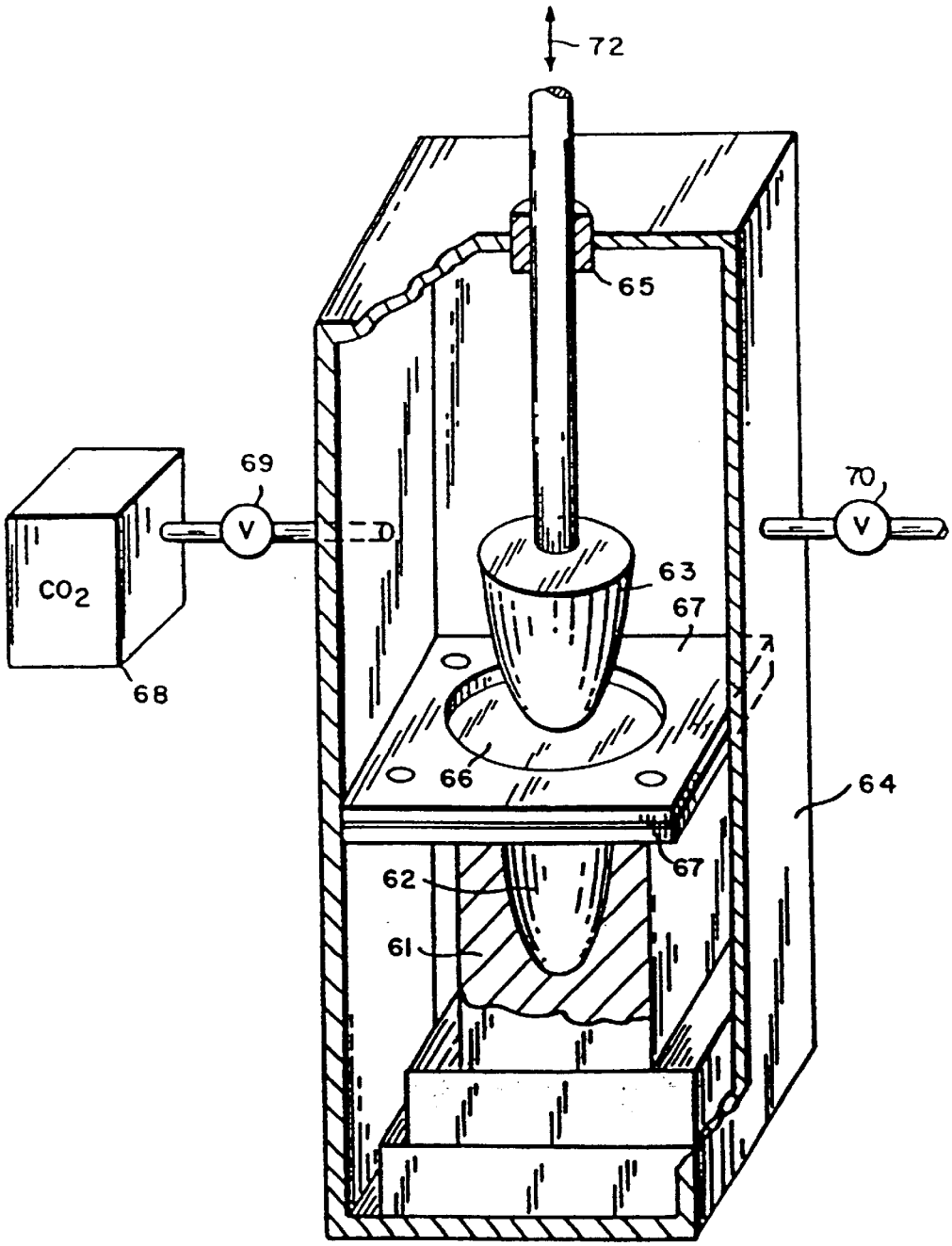
FIG. 17 depicts a system in which the foaming of a material and the forming of an article therefrom can take place in accordance with the invention.

The embodiments discussed with reference to FIGS. 1–16 disclose techniques in which foaming can take place, using supercritical fluids, at various temperatures, i.e., at room (ambient) temperature or at higher temperatures. FIG. 17 depicts an exemplary system in which the foaming operation and the forming of an article therefrom can be accomplished in the same overall operation at ambient, or room temperature. As can be seen therein, a mold comprising a lower mold body 61 having a mold cavity 62 and an upper mold body 63 shaped to conform to the mold cavity 62 are arranged so that mold body 61 is fixedly mounted within a chamber 64 and mold body 63 is movably mounted to move reciprocally into and out of cavity 62 using a suitable externally applied hydraulic jack or piston force, as shown by arrow 72, via a suitable dynamic pressure seal 65. A pliable sheet 66 of a polymer plastic material is mounted above cavity 62 of mold body 61 between two suitably shaped holders 67 so that, when mold body 63 is moved downwardly into cavity 62, a cup-shaped article of polymer plastic material can be formed therebetween. Prior to forming the article, a supercritical fluid, e.g., $CO_2$ in its supercritical state, from a source 68 thereof, is supplied to chamber 64 via a suitable valve 69, the supercritical fluid normally being supplied at a temperature higher than ambient temperature. Chamber 64 is pressurized to a relatively high pressure, e.g., 3000 p.s.i. (PMa), the temperature within chamber 64, however, being maintained at a suitable temperature on the order of the critical temperature, or higher, of the supercritical fluid. The supercritical fluid in effect saturates the polymer sheet 66 after a time period which depends on the polymer material involved. The temperature in chamber 64 is reduced to room (ambient) temperature and, when the polymer sheet is saturated with supercritical fluid, the mold body 63 is moved downwardly into cavity 62 and, preferably, the pressure in the chamber is then reduced via the operation of pressure relief valve 70. The drop in pressure causes a cell nucleation and cell expansion within the polymer material as the molding of the article occurs, thereby causing a foaming of the polymer material and the forming of an article from the foamed material, the article having a supermicrocellular structure. Accordingly, the article is both foamed and formed at room (ambient) temperature in one overall operation.

In the above disclosed embodiments, there is a finite time which is required for a polymer material to be come saturated with a supercritical fluid. i.e., for a sufficient amount of supercritical fluid to be introduced into the polymer to form a fluid/polymer solution which can be appropriately foamed to provide a desired supermicrocellular foamed material. While in some cases such time can be as low as 10 minutes, e g, when using a soft PVC material having a thickness of 1/16 (1.59 mm), in other cases longer times may be required depending on the thickness desired. While such embodiments can be useful in many applications, in other applications it may be desirable to reduce the time need for such purpose. For example, in order to enhance the ability to use the technique of the invention in some applications to achieve relatively high production rates for obtaining supermicrocellular formed material, it is often desirable to use much shorter saturation time periods. One technique for doing so is depicted in the system shown in FIG. 18 in which a supercritical fluid is introduced into an extrusion barrel 70, for example, for injecting the saturated material into a mold.

Figure 18:
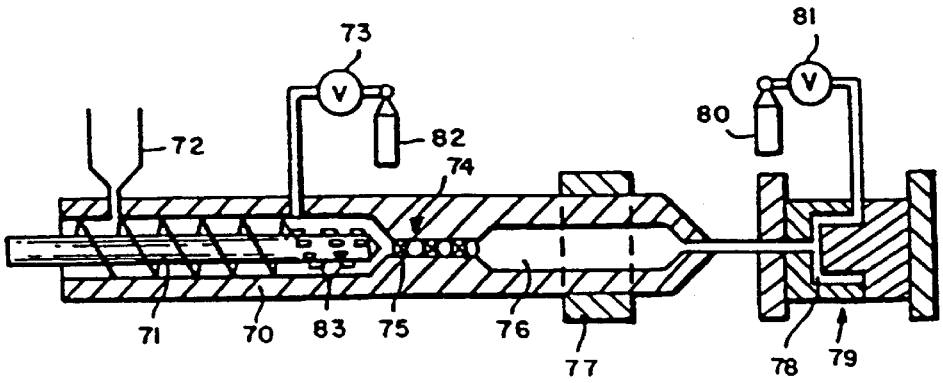
FIG. 18 depicts an injection molding system in accordance with the invention in which the time required for saturation of a material by a supercritical fluid is greatly reduced from that normally required for microcellular foaming.

As can be seen in the diagrammatic presentation of FIG. 18, an extrusion barrel 70 utilizes a screw 71, with integrated mixing elements 83, of a type having irregular blades, as would be well known to those in the art, into which plastic pellets of a polymer material are introduced via a hopper assembly 72. The extrusion barrel is heated so that the pellets become plasticized and reached a molten state as they are moved by the mixing screw along the barrel 70, in a manner similar to that discussed with reference to FIGS. 14, 15 and 16. A source 82 of $CO_2$ gas is introduced into the extrusion barrel at a selected position along mixing screw 71 via the operation of a suitable flow control valve 73, the temperature and pressure in the extrusion barrel at that point being controlled so as to be greater than the critical temperature and pressure for converting the $CO_2$ in gaseous form into $CO_2$ in its supercritical state. The $CO_2$ gas may be preheated before insertion, if desired, to prevent too sudden an increase in pressure in the barrel at the higher temperature of the barrel. Alternatively, the $CO_2$ gas can be converted to its supercritical state externally to the extrusion barrel said supplied to the mixing screw as a supercritical $CO_2$ fluid.

The supercritical $CO_2$ fluid is mixed with the molten polymer material by the mixing screw and such mixing enhances the subsequent diffusion into, and effective saturation of supercritical $CO_2$ fluid in, the polymer because the contact area of the two materials being mixed is increased by the mixing process and the depth required for diffusion is decreased thereby.

Thus, the supercritical $CO_2$ fluid is mixed with the molten polymer by the motion of the mixing screw to aid in forming a solution. As the mixture screw rotates, it generates a two-dimensional shear field in the mixed $CO_2$/polymer system. The bubbles of supercritical $CO_2$ fluid in the polymer melt are stretched along the shear directions of the shear field. The stretched bubbles are then broken into smaller spherical shaped bubbles by the perturbation of the laminar flow which is generated by the mixing screw. The irregular blades used in the mixing screw change the orientation of the $CO_2$/polymer interface relative to the streamlines, which change increases the efficiency of the laminar mixing occurring therein.

The $CO_2$/polymer mix is supplied to a static mixer 74 which continually changes the orientation of the $CO_2$/polymer interface relative to the streamlines and thereby also enhances the mixing process. Static mixers for use in an extrusion barrel are well known to the art and are made and sold commercially. The diameter of static mixer 74 should be small and the static mixer can comprise a selected number of mixer elements 75, as further discussed below.

If the diameter of the static mixer elements is too large, the flow rate of the $CO_2$/polymer mixture therethrough is small and, consequently, the shear field generated by the static mixer elements is small. The spherical shapes of the bubbles would thereby be maintained because the surface tension would be dominant and, in effect, the surface tension would overcome the effect of the relatively small shear field. When the flow rate is too small, a static mixer is not effective for mixing the $CO_2$/polymer system into a solution because of such dominant surface tension. Hence, it is desirable to make the diameter of the static mixer relatively small.

The characteristic length of the static mixing which occurs in static mixer 74, i.e., the striation thickness of the mixed $CO_2$/polymer layers, is approximately $d/2^n$ where d is the diameter of the static mixer elements and n is the number of the mixing elements 75. Better mixing occurs when mixer elements having a small radius are used because such characteristics length of the mixing decreases as the diameter decreases, as well as when a relatively large number of mixing elements is used. The number of mixing elements and the diameters thereof can be selected so as to assure a satisfactory and adequate static mixing operation.

During the static mixing of the $CO_2$/polymer system, the $CO_2$ molecules in the bubbles also tend to diffuse somewhat into the polymer melt material which surrounds each bubble. However, the primary diffusion operation takes place in a diffusion chamber 76 into which the two-phase gas/polymer mixture is introduced. The mixture then becomes a complete single-phase solution in the diffusion chamber as the $CO_2$diffuses into the polymer therein. The $CO_2$ concentration in the single-phase $CO_2$/polymer solution thereby produced is substantially uniform throughout the solution and the solution is effectively homogeneous. If the supercritical $CO_2$ fluid does not diffuse into and saturate the polymer uniformly and homogeneously, the foamed structure that is ultimately formed will not be uniform because the cell morphology strongly depends on the local gas concentration in the solution.

The homogeneous and uniform fluid/polymer solution in diffusion chamber 76 is then heated in a heating section 77 thereof where the solution is rapidly heated (in a typical case the temporary may rise from about 190° C. to about 245° C., in about 1.0 second, for example), so as to form nucleated cells in the saturated solution due to the thermodynamic instability which is created because of the decreased ability of the fluid/polymer solutions at the higher temperature. The greater the decrease in solubility which occurs, the higher the cell nucleation rate and the larger the number of cells nucleated. To prevent the nucleated cells from growing in the extrusion barrel 70 a high barrel pressure is maintained. The solution with nucleated cells is then injected into a mold cavity 78 of a mold 79, the pressure in the mold cavity being controlled by providing a counter pressure to prevent cell growth during the mold filling process. The counter pressure is provided by the insertion of air under pressure from a source 80 thereof via shut-off valve 81. Finally, cell growth occurs inside the mold cavity when the mold cavity is expanded and the pressure therein is reduced rapidly, thereby producing a pressure instability which enhances cell growth.

Accordingly, expansion of the mold provides a molded and foamed article having the small cell sizes and high cell densities desired. By using a mixing screw for providing a shear field which produces a laminar flow of the mixed materials and then by using both a static mixer having small diameter mixing elements and a selected number of such mixing elements and a diffusion chamber, saturation of the polymer material with supercritical $CO_2$ fluid occurs. The time period required to provide such saturation can be reduced from that required in the embodiments of the invention discussed previously so that it is possible to achieve continuous operation at relatively high production rates that would not be possible when longer saturation times are needed.

The provision of extremely small cell sizes and high densities thereof in a foamed polymer material, as achieved when using supercritical fluids to provide the foaming operation, as described with reference to the above embodiments of the inventions brings about substantially improved properties for the foamed materials obtained, particularly compared with previous standard cellular or microcellular foamed materials. Thus, the mechanical strengths and toughness thereof are substantially greater, even when the weight of the material (i.e., the material density) is considerably reduced. Moreover, less polymer material is used in the process and, accordingly, material is conserved and the costs thereof are reduced.

While the embodiments of the invention described above represent preferred embodiments thereof, modifications thereof and still other embodiments may occur to those in the art within the spirit and scope of the invention. Hence, the invention is not to be construed as limited to the specific embodiments thereof described above, except as defined by the appended claims.

What is claimed is:

[1. A system for producing a foamed material comprising extrusion means means connected to said extrusion means for supplying a material to be foamed to said extrusion means;

die means for shaping material;

said extrusion means connected to said die means for providing extruded material to said die means;

means for heating and extrusion means to cause said extrusion means to provide said extruded material at a higher temperature than room temperature to permit said die means to produce shaped continuous heated material;

means for engaging and transporting said shaped continuous heated material through an enclosed volume;

means connected to said enclosed volume for supplying supercritical fluid to said enclosed volume to introduce said supercritical fluid into said shaped continuous heated material at a higher pressure than atmospheric pressure;

means for retaining said shaped continuous heated material within said enclosed volume for a sufficient client time period to permit said supercritical fluid to saturate said shaped continuous heated material;

means for removing said shaped continuous heated material saturated with said supercritical fluid from said enclosed volume at a pressure which is less than said higher pressure; and foam heating means for heating said material which has been removed from said enclosed volume so as to produce shaped continuous heated foamed material having a plurality of cells distributed substantially throughout said foamed material.]

[2. A system in accordance with claim 1 wherein said die means is a sheet die means for providing a continuous sheet of heated material.]

[3. A system in accordance with claim 2 wherein;

said engaging and transporting means includes a plurality of rollers maintained at a substantially constant temperature for transporting said continuous sheet of heated material through said enclosed volume; and said retaining means including means for controlling the position of at least one of said rollers so as to control the residence time of said continuous sheet of heated material as it is transported through said enclosed volume.]

[4. A system in accordance with claim 2 wherein said removing means includes a dynamic pressure seal through which said heated sheet material is removed from said enclosed volume and further including chilled roller means engaging and transporting said removed heated sheet material from said enclosed volume at a temperature below and higher temperature.]

[5. A system in accordance with claim 2 wherein said foam heating means includes at least one heater and heater transporting means engaging said removed sheet material for transporting said removed sheet material along a path adjacent said heaters.]

[6. A system in accordance with claim 5 wherein said heater transporting means includes:

at least one roller; and means for controlling the position of at least one of said rollers to control the time over what said sheet is transported along said path adjacent said heaters.]

[7. A system in accordance with claim 2 and further including means for further engaging said removed continuous sheet of heated foamed material for annealing said continuous sheet of heated foamed material.]

[8. A system for providing a foamed material comprising extrusion means;

die means connected to said extrusion means for shaping material;

means connected to said extrusion means for supplying a material to be foamed to said extrusion means;

means for heating said extrusion means to place said material into a molten state during the extrusion thereof in said extrusion means;

means connected to said extrusion means for supplying a supercritical fluid at a higher pressure than atmospheric pressure to said extrusion means to introduce said supercritical fluid into said molten material so that said material is saturated with said supercritical fluid to form a solution, said supercritical fluid saturated material being supplied from said extrusion means to said die means to produce a shaped continuous material saturated with said supercritical fluid;

means for engaging and transporting said shaped continuous material through an enclosed volume having a pressure which is lower than said higher pressure so as to produce cell nucleation in said shaped continuous material and means for maintaining the temperature of said shaped continuous material at a selected temperature as said material is transported through said enclosed volume at said lower pressure; and foam heating means comprising heaters for heating said shaped continuous material as it exits said enclosed volume so as to produce a shaped continuous foamed material having a plurality of cells distributed substantially throughout said shaped continuous foamed material.]

[9. A system in accordance with claim 8 wherein said die means is a sheet die means for providing a continuous sheet of material.]

[10. A system in accordance with claim 9 wherein said transporting and temperature maintaining means includes a plurality of chilled rollers.]

[11. A system in accordance with claim 10 wherein said engaging and transporting means further includes means for controlling the position of at least one said rollers so as to control the residence time of said continuous sheet of material as it is transported through said enclosed volume.]

[12. A system in accordance with claim 9 wherein said foam heating means includes:

at least one roller engaging and transporting said continuous sheet of material exiting said enclosed volume along a path adjacent said heaters; and means for controlling the position of at least one of said one or more rollers to control the time over which the continuous sheet of material is transported along said path adjacent said heaters.]

[13. A system in accordance with claim 9 and further including means further engaging said continuous sheet of foamed material for annealing said continuous sheet of foamed material.]

[14. A system for producing a foamed material comprising extrusion means;

die means connected to said extrusion means for shaping material;

means for supplying a material to be foamed to said extrusion means;

means for heating said extrusion means to place said material in a molten state during extrusion thereof in said extrusion means;

means connected to said extrusion means for supplying a supercritical fluid at a higher pressure than atmospheric pressure to said extrusion means to introduce said supercritical fluid into said molten material so that said molten material is effectively saturated with said supercritical fluid, said material which is saturated with said supercritical fluid being supplied from said extrusion means to said die means to produce a shaped continuous material;

means for engaging and transporting said shaped continuous material through an enclosed volume having a pressure which is substantially the same as said higher pressure and means for maintaining the temperature of said shaped continuous material at a selected temperature as said shaped continuous material is transported through said enclosed volume at said higher pressure; and means for reducing the pressure and the temperature of said shaped continuous material as it exits from said enclosed volume so as to produce a shaped continuous foamed material having a plurality of cells distributed substantially throughout said shaped continuous foamed material.]

[15. A system in accordance with claim 14 wherein said die means is a sheet die means for providing the continuous sheet of material.]

[16. A system in accordance with claim 15 wherein said transporting and temperature maintaining means includes a plurality of rollers.]

[17. A system in accordance with claim 16 wherein said engaging and transporting means further include means for controlling the position of at least one of said rollers to control the residence time of said continuous sheet of material as it is transported through said enclosed volume.]

[18. A system in accordance with claim 15 and further including at least one chilled roller positioned near the exit of said enclosed volume through which said continuous sheet of foamed material passes so as to maintain the foamed condition thereof.]

[19. A system in accordance with claim 15 and further including means further engaging said continuous sheet of foamed material for annealing said continuous sheet of foamed material.]

[20. A system for producing a foamed material comprising extrusion means;

die means connected to said extrusion means for shaping material;

means for supplying a material to be foamed to said extrusion means;

means for heating said extrusion means to place said material in a molten state during extrusion thereof in said extrusion means;

means connected to said extrusion means for supplying a supercritical fluid at a higher pressure than atmospheric pressure to said extrusion means to introduce said supercritical fluid into said molten material so that said molten material is substantially saturated with said supercritical fluid, said saturated molten material being supplied from said extrusion means to said die means to produce a shaped continuous material;

means for engaging and transporting said shaped continuous material through a first enclosed volume having a controllable pressure which is lower than said higher pressure to produce cell nucleation in said shaped continuous material and means for maintaining the temperature of said shaped continuous material at a selected temperature to maintain said cell nucleation as said shaped continuous material is transported through said first enclosed volume at said lower pressure; and means for engaging said shaped continuous material as it exits from said first enclosed volume and for transporting said exiting material into a second enclosed volume having a pressure lower than said controllable pressure so as to produce a shaped continuous foamed material having a plurality of cells distributed substantially throughout said shaped continuous foamed material.]

[21. A system in accordance with claim 20 wherein said die means is a sheet die means for providing a continuous sheet of material.]

[22. A system in accordance with claim 20 wherein the pressure in said second enclosed volume is at atmospheric pressure.]

[23. A system in accordance with claim 20 and further including means for controlling the residence times of said shaped continuous material in said first and second enclosed volumes.]

[24. A system for producing a foamed material comprising a barrel;

a screw member mounted for rotation within the barrel and having a plurality of irregular blades positioned on said screw member;

means for introducing a material to be formed into said barrel for movement along said barrel toward said irregular blades by said screw member;

means for heating said barrel to place said material into a molten state;

means for introducing a supercritical fluid into said barrel at said irregular blades at a temperature and pressure above the critical temperature and pressure of said supercritical fluid for mixing said fluid with said molten material to provide a mixture thereof;

a static mixer for receiving said mixture and for changing the orientations of the interfaces between said material and said supercritical fluid in the mixture;

a diffusion chamber for receiving said mixture from said static mixer to diffuse the supercritical fluid into the material to be foamed, said static mixture and diffusion chamber providing to provide a solution of said material substantially saturated with said fluid and having a substantially uniform concentration of fluid throughout said solution;

means for rapidly heating said solution to provide a plurality of nucleated cells in said solution at a pressure which prevents expansion of said cells in the solution;

means for receiving said solution from said diffusion chamber and for expanding the cells in said solution to provide a foamed material.]

[25. A system in accordance with claim 24 wherein said receiving means includes a mold for receiving said solution from said diffusion chamber and having a counter pressure for initially preventing expansion of said cells in the solution; and means for subsequently rapidly reducing the counter pressure in said mold to expand the cells in said solution to provide a molded foamed article in said mold.]

*26. A system for producing microcellular foamed material comprising:*

*an extruder including an extruder barrel constructed to house a polymer processing mixing screw, the extruder having an inlet at an inlet end thereof designed to receive a precursor of microcellular foamed material, an outlet at an outlet end thereof designed to release microcellular foamed material from the extruder, and an enclosed passageway connecting the inlet with the outlet constructed and arranged to receive a foaming agent in the vicinity of a mixing section of the polymer processing mixing screw and to contain a homogeneous mixture of the foaming agent with material to be foamed in a fluid state at an elevated pressure and temperature above the critical temperature and pressure of the foaming agent within the passageway and to advance the mixture as a fluid stream within the passageway in a downstream direction from the inlet end toward the outlet end; and*

*a nucleating pathway associated with the outlet end constructed and arranged to nucleate the homogeneous mixture at a rate sufficient to produce microcellular foamed material and to release the material to be foamed to a region downstream of the nucleator at a pressure lower than the elevated pressure.*

*27. A system as in claim 26, wherein the enclosed passageway is constructed and arranged to contain a supercritical fluid admixed with the material to be foamed and to maintain the supercritical fluid in a supercritical state therein.*

*28. A system as in claim 26, wherein the region downstream of the nucleator at a pressure lower than the elevated pressure is a molding chamber.*

*29. A system as in claim 26, wherein the passageway is connectable to a source of a foaming agent comprising carbon dioxide.*

*30. A system as in claim 26, wherein the passageway is connectable to a source of a foaming agent consisting of carbon dioxide.*

*31. A system as in claim 26, wherein the passageway is connectable to a source of a foaming agent comprising supercritical carbon dioxide.*

*32. A system as in claim 26, wherein the passageway is connectable to a source of a foaming agent consisting of supercritical carbon dioxide.*

*33. A system as in claim 26, wherein the passageway is connectable to a source of a foaming agent comprising a supercritical fluid.*

*34. A system as in claim 26, wherein the extruder includes a heatable barrel constructed and arranged to contain molten thermoplastic polymeric material.*

*35. A system as in claim 26, wherein the outlet of the extruder comprises a sheet die.*

*36. A system as in claim 26, wherein the nucleator is a reduced cross-section orifice capable of nucleating the product in the passageway via rapid pressure drop.*

*37. A system as in claim 26, wherein the nucleator comprises a sheet die.*

*38. A system as in claim 26, wherein the extruder barrel contains a screw and the extruder inlet comprises a hopper assembly for receiving polymer pellets.*

*39. A system as in claim 26, wherein the enclosed passageway of the extruder is constructed and arranged to form the product comprising a single-phase solution of molten thermoplastic polymeric material and supercritical fluid and to advance the single-phase solution in the enclosed passageway.*

*40. A system as in claim 26, constructed and arranged to produce microcellular polymeric material, wherein the extruder includes a heatable barrel, containing a screw, constructed and arranged to contain molten thermoplastic polymeric material and to introduce a foaming agent consisting of carbon dioxide, via the passageway, into the molten polymeric material and to form a single-phase solution of molten polymeric material and carbon dioxide above the critical temperature and pressure of carbon dioxide and to advance the single-phase solution in the barrel and to nucleate the single-phase solution at the nucleator by subjecting the single-phase solution to a rapid pressure drop, and the extruder inlet comprises a hopper assembly for receiving polymer pellets.*

*41. A system as in claim 40, wherein the outlet of the extruder comprises a sheet die.*

*42. A system as in claim 40, wherein the nucleator comprises a sheet die.*

*43. A system for producing polymeric microcellular molded foamed material comprising:*

*an extruder having an inlet for receiving a precursor of a foamed material at an inlet end thereof, an outlet at an outlet end thereof, and an enclosed passageway connecting the inlet with the outlet constructed and arranged to contain a product of the mixture of a supercritical fluid and molten material to be foamed within the passageway and to maintain the product above the critical temperature and pressure of the supercritical fluid therein:*

*a nucleator associated with the passageway capable of nucleating the product in the passageway in the absence of an auxiliary nucleating agent;*

*an orifice between the inlet and the outlet, fluidly connectable to a source of supercritical fluid or supercritical fluid precursor arranged such that supercritical fluid, admixed with molten material in the extruder, can be maintained in a supercritical state in the extruder; and*

*a molding cavity fluidly connected to the outlet of the extruder.*

*44. A system as in claim 43, including a source of counter pressure associated with the molding cavity.*

*45. A system as in claim 44, wherein the source of counter pressure is connected to the molding cavity via a conduit including a shut-off valve.*

*46. A system as in claim 45, wherein the source of counter pressure is a source of air under pressure.*

*47. A system as in claim 43, wherein the source of counter pressure is a source of air under pressure.*

*48. A system as in claim 43, wherein the molding cavity is expandable.*

*49. A system as in claim 43, constructed an arranged to produce molded microcellular material.*

*50. A system as in claim 43, wherein the orifice is connectable to a source of a foaming agent comprising carbon dioxide.*

*51. A system as in claim 43, wherein the orifice is connectable to a source of a foaming agent consisting of carbon dioxide.*

*52. A system as in claim 43, wherein the orifice is connectable to a source of a foaming agent comprising supercritical carbon dioxide.*

*53. A system as in claim 43, wherein the orifice is connectable to a source of a foaming agent consisting of supercritical carbon dioxide.*

*54. A system as in claim 43, wherein the orifice is connectable to a source of a foaming agent comprising a supercritical fluid.*

*55. A system as in claim 43, wherein the extruder includes a heatable barrel constructed and arranged to contain molten thermoplastic polymeric material and to introduce carbon dioxide, via the orifice, into the molten polymeric material.*

*56. A system in claim 43, wherein the extruder barrel contains a screw and the extruder inlet comprises a hopper assembly for receiving polymer pellets.*

*57. A system as in claim 43, wherein the extruder barrel is constructed and arranged to form a single-phase solution of molten polymer material and foaming agent above the critical temperature and pressure of the foaming agent and to advance the single-phase solution in the barrel.*

*58. A system as in claim 43, constructed and arranged to produce molded microcellular polymeric material, wherein the extruder includes a heatable barrel, containing a screw, constructed and arranged to contain molten thermoplastic polymeric material and to introduce a foaming agent consisting of carbon dioxide, via the orifice, into the molten polymeric material and to form a single-phase solution of molten polymer material and carbon dioxide above the critical temperature and pressure of carbon dioxide and to advance the single-phase solution in the barrel and to nucleate the single-phase solution at the nucleator by subjecting the single-phase solution to a rapid pressure drop, and the extruder inlet comprises a hopper assembly for receiving polymer pellets.*

*59. A system for producing microcellular foamed material comprising:*

*an extruder including an extruder barrel constructed to house a polymer processing screw, the extruder having an inlet at an inlet end thereof designed to receive a precursor of microcellular foamed material, an outlet at an outlet end thereof designed to release microcellular foamed material from the extruder, and an enclosed passageway connecting the inlet with the outlet constructed and arranged to receive a foaming agent in the vicinity of the polymer processing screw and to form therein a homogeneous, single-phase solution of the foaming agent with material to be foamed in a fluid state at an elevated pressure and temperature above the critical temperature and pressure of the foaming agent within the passageway and to advance the solution as a fluid stream within the passageway in a downstream direction from the inlet end toward the outlet end; and*

*a nucleating pathway associated with the outlet end constructed and arranged to nucleate the homogeneous mixture at a rate sufficient to produce microcellular foamed material and to release the material to be foamed to a region downstream of the nucleator at a pressure lower than the elevated pressure.*

*60. A system as in claim 43, wherein the extruder includes a barrel constructed to house a polymer processing screw, the orifice being positioned in the barrel in the vicinity of the polymer processing screw.*

*61. A system as in claim 35, wherein the extruder barrel is constructed to house a polymer processing mixing screw and the orifice is positioned in the barrel in the vicinity of a mixing section of the screw.*

*62. A system as in claim 43, wherein the enclosed passageway is constructed and arranged to form a single-phase solution of foaming agent and polymeric material therein.*

* * * * *